US007883051B2

(12) United States Patent
Sammy

(10) Patent No.: US 7,883,051 B2
(45) Date of Patent: Feb. 8, 2011

(54) DUCTED PROPULSION VECTOR SYSTEM

(75) Inventor: Johann Q. Sammy, 48 Rosalind Rd., Weymouth, MA (US) 02191

(73) Assignee: Johann Q. Sammy, Weymouth, MA (US)

( * ) Notice: Subject to any disclaimer, the term of this patent is extended or adjusted under 35 U.S.C. 154(b) by 752 days.

(21) Appl. No.: 12/057,082

(22) Filed: Mar. 27, 2008

(65) Prior Publication Data
US 2009/0242690 A1 Oct. 1, 2009

(51) Int. Cl.
*B64C 29/00* (2006.01)
(52) U.S. Cl. ................ 244/12.5; 244/23 D; 239/265.29
(58) Field of Classification Search ................ 244/12.5, 244/23 D, 7 B, 110 B; 60/229; 239/265.27, 239/265.29
See application file for complete search history.

(56) References Cited
U.S. PATENT DOCUMENTS

| | | | | |
|---|---|---|---|---|
| 2,838,909 A * | 6/1958 | Meulien | ................ | 239/265.23 |
| 3,169,728 A * | 2/1965 | Langfelder et al. | ......... | 244/23 R |
| 3,174,709 A * | 3/1965 | Alderson | ................... | 244/23 D |
| 3,248,878 A * | 5/1966 | Clark et al. | .................... | 60/229 |
| 3,806,068 A * | 4/1974 | Blythe et al. | .............. | 244/53 R |
| 3,997,134 A * | 12/1976 | Drakeley | ................ | 244/110 B |
| 4,505,443 A * | 3/1985 | Bradfield et al. | ........... | 244/12.5 |
| 4,714,197 A * | 12/1987 | Thayer et al. | .......... | 239/265.29 |
| 7,364,115 B2 * | 4/2008 | Parks et al. | ................ | 244/12.4 |

* cited by examiner

Primary Examiner—Timothy D Collins
Assistant Examiner—Justin Benedik
(74) *Attorney, Agent, or Firm*—Lawrence S. Cohen

(57) ABSTRACT

A ducted propulsion vector system that vectors thrust generated from ducted fan powered aircraft. The system has hinged duct flaps may be vectored from +10 degrees up and turned through −90 degrees downward. Vectored downward 90 degrees, the flaps vector thrust enabling vertical/short takeoff and landing of an aircraft. Hover control is facilitated by internal mounted vanes in line of the thrust stream. The duct flaps are transitioned at operator's input to enable the aircraft to achieve forward flight.

20 Claims, 16 Drawing Sheets

DUCTED PROPULSION VECTOR SYSTEM

BACKGROUND

1. Field

This disclosure relates to propulsion systems for airborne vehicles. More particularly, the present disclosure describes a ducted propulsion vectoring system, which vectors thrust or propulsive force generated by a ducted fan in an airborne vehicle.

2. Description of Related Art

Vertical/short take off landing (V/STOL) capabilities are known in both general aviation aircraft and military aircraft. General aviation V/STOL aircraft have largely been dominated by the rotary wing configuration (helicopter) but are limited in speed by the inefficiencies of the rotary wing and are confined to landing/takeoff locations (heli-pads) due to the wide rotor arcs and potential hazard to people and property from the rotary wing. Military jet aircraft, such as the McDonnell Douglas AV-8B Harrier, provide offensive and defensive capabilities of fighter jets, while still providing a capability for V/STOL operation. Other military V/STOL aircraft, such as the Bell Boeing V-22 Osprey, provide enhanced lift and mission capabilities over traditional helicopters. Military V/STOL aircraft provide surveillance, search and rescue, aerial attack and reconnaissance missions from remote and un-accessible areas where conventional take-off and landing aircraft would be unable to operate.

Several types of V/STOL aircraft and related propulsion systems have been proposed in the art. Issued patents discussing V/STOL systems include the following: U.S. Pat. No. 3,912,207, "Aircraft," issued Oct. 14, 1975 to Bradbury; U.S. Pat. No. 4,230,292, "Propulsion/control for VTOL vehicle," issued Oct. 28, 1980 to Van Nimwegen; U.S. Pat. No. 4,358,074, "Propulsion system for V/STOL aircraft," issued Nov. 9, 1982 to Schoen, et al.; U.S. Pat. No. 4,709,880, "Method and system for improved V/STOL aircraft performance," issued Dec. 1, 1987 to Bradfield, et al.; U.S. Pat. No. 5,295,643, "Unmanned vertical take-off and landing, horizontal cruise, air vehicle," issued Mar. 22, 1994 to Ebbert, et al.; and U.S. Pat. No. 5,758,844, "Vertical/short take-off and landing (V/STOL) air vehicle capable of providing high speed horizontal flight," issued Jun. 2, 1998 to Cummings.

BRIEF DESCRIPTION OF THE DRAWINGS

FIG. 10A is detailed view of variable guide vane and duct flap position(s) in forward flight. FIG. 10B is detailed view of variable guide vane(s) and duct flap positions in hover.

DESCRIPTION

Figure 1A:
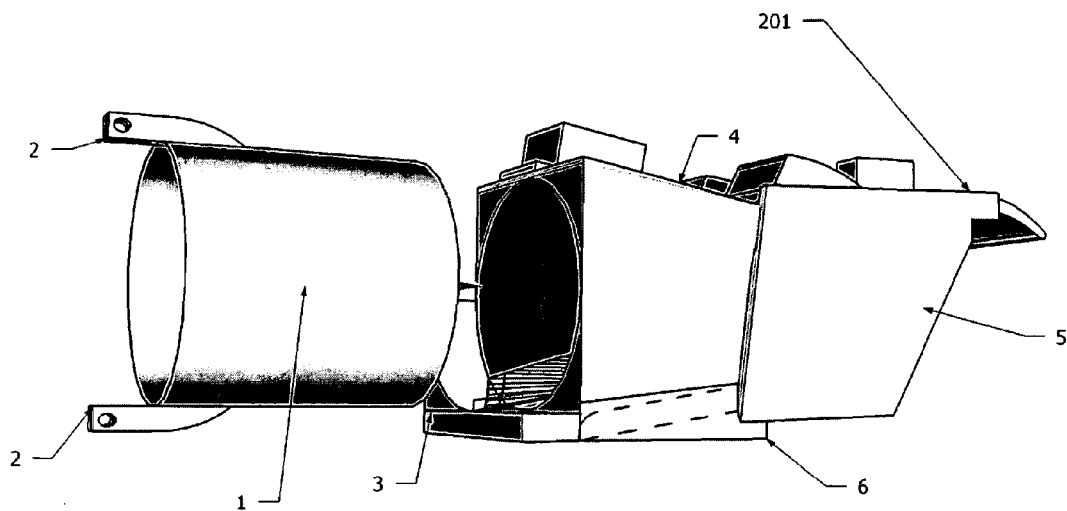
FIGS. 1A-1G illustrate components of a ducted propulsion vectoring system in various views, exploded and cut-away.

Embodiments of the present invention provide a thrust vectoring system that vectors thrust generated from ducted fan powered aircraft. A preferred embodiment of the invention has hinged duct flaps that may be vectored from +10 degrees (up) and turned through −90 degrees (downward). Vectored downward 90 degrees the flaps vector thrust enabling vertical/short takeoff and landing of an aircraft. Hover control is facilitated by internal mounted vanes in line of the thrust stream. The duct flaps are transitioned at operator's input to enable the aircraft to achieve forward flight.

One embodiment of the present invention comprises a ducted propulsion vectoring system having three sections: a forward duct structure that may be coupled to the exit of a ducted fan powerplant; a variable flap structure that has one or more variable flaps; and an aft duct structure that couples to the forward duct structure and provides a mount for the variable flaps. The forward duct structure may further comprise an inlet guide vane disposed within the forward structure and control equipment disposed on the outer walls of the structure used for the operation of the ducted propulsion vectoring system. The variable flaps of the variable duct structure are preferably hinged to the outer walls of the aft duct structure at the top and bottom of those walls.

The geometry of the forward duct structure is preferably based on the fan swept area (FSA) of the ducted fan powerplant, which is the square area of the rotor/impeller diameter less motor housing diameter. The total area of the forward duct structure diameter also includes the inlet guide vane area. The total area of the forward duct structure is then reduced by the area of the inlet guide vane. However, the diameter of the forward duct structure should match the ducted fan exit for alignment. The thickness of the inlet guide vane may be adjusted so that the total diameter of the forward structure is equal to 100% FSA of the duct fan unit to ensure efficient thrust flow.

The geometry of the aft duct structure is based on the fan swept area of the ducted fan powerplant, which is the square area of the rotor/impeller diameter less motor housing diameter. The exit diameter of the aft duct structure preferably should be within 85-100% of the FSA of the ducted fan powerplant. The interior geometry of the aft duct structure is preferably conical and preferably approximately 50% of the lower aft mid-section area is removed and the walls are curved for airflow to allow thrust to be deflected downward. A rudder vane may also be located within the aft duct structure when the variable flaps are deflected downward for v/stol operation. The total area of the aft duct structure exit diameter, therefore, should also include the area of the rudder vane. Two flow guides may be mounted at the bottom of the aft duct structure and extending upward. These flow guides prevent air loss at transition from the coned exit section of the aft duct structure to the variable flap structure.

The forward section of the variable flaps (top and bottom) of the variable flap structure are the hinge points. A servo actuator may be disposed on the slope of the aft duct structure to provide the necessary torque via push-pull rods to operate the flaps. The flaps may also be independently operated via airframe mounted servo-actuators and tandem controlled with gyroscope for pitch control. The variable flap structure may also serve as a mount for a rudder servo-actuator, rudder vane and a push-pull rod linkage track. Two linkage rods may connect the aft portion of the flaps. The rod length may vary and preferably is a fixed length. When sized, the rods preferably allow for full deflection of the variable flaps from +10 degrees (up) turned through to −10 degrees (downward and slightly forward).

Bernoulli's principle of fluid flow within a duct provides that there is an inverse relationship between pressure and velocity. Higher pressure equals low velocity. High velocity equals low pressure. In a preferred embodiment of the present invention, the aft duct structure is the high pressure area. Since the aft duct structure exit diameter is preferably 85%-100% of the FSA, the aft duct structure exit diameter is preferably smaller in diameter than the exit diameter of the ducted fan powerplant. As fluid (air) is constricted by the smaller diameter, pressure also increases, however, not to the point where velocity has less measured force than necessary to achieve vertical lift. As long as the velocity or efflux (exit velocity after the fan) is greater by a thrust to weight ratio of 1.0 to 1, v/stol lift can be accomplished. The target thrust to weight ratio for preferred embodiments of the present invention is 1.3:1. Therefore a ducted fan powerplant capable of generating efflux greater than 1.3:1 for this configuration is desired. The variable duct structure has a changing diameter due to its nature of operation. With fixed linkage, the average diameter of the flaps may range from 80% FSA (full deflection downward-slightly forward, high pressure, minimum lift) to 85%-110% FSA when transitioning to forward controlled flight. Higher diameter (85%-100%) to FSA equals greater velocity (heave force) and lower pressure (air-speed). However, too much diameter leads to thrust loss as velocity will escape into the free-steam. Therefore, the variable diameter maximum of 110% FSA on the variable flap diameter is not realized until aircraft airspeed is greater than the wing's stall speed.

Embodiments of the present invention are more particularly described in the following examples that are intended as illustrative only since numerous modifications and variations therein may be apparent to those skilled in the art. As used in the specification and in the claims, "a," "an," and "the" can mean one or more, depending upon the context in which it is used. Several embodiments of the present invention are now described with reference to the figures, in which like numbers indicate like parts throughout the figures.

Figure 1B:
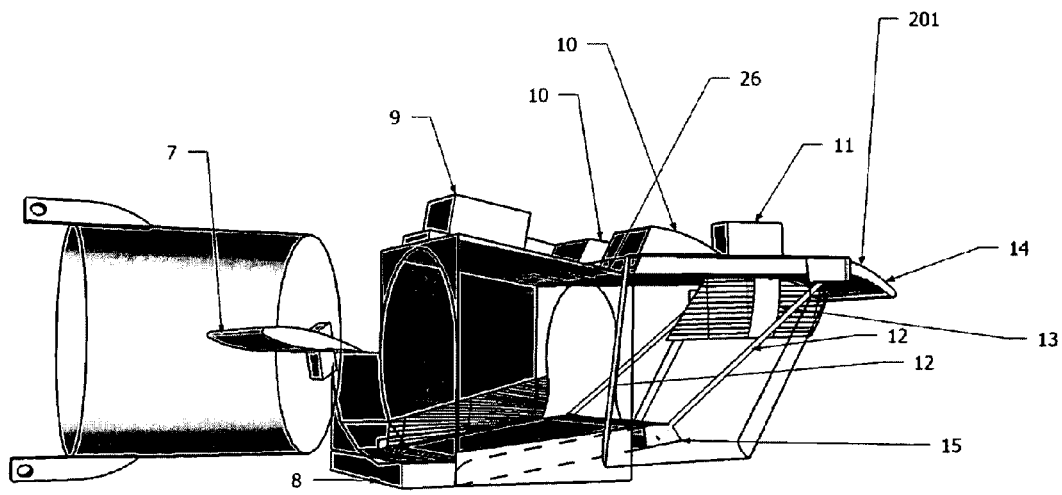

As shown in FIG. 1A (left side view, aft looking forward) and FIG. 1B (left side cross-section, cut-away view), components of a ducted propulsion vector system according to an embodiment of the present invention system comprise a forward annular shaped duct 1 that serves as housing for a variable guide vane 7, which may be joined to the rear of a ducted fan powerplant by mounting flanges 2. Air flows through the forward duct to the conically shaped internal cross-section area of an aft duct 4. The forward duct 1 may also be a mounting point for a servo actuator 8, as shown in FIG. 1B, that transfers torque via a shaft to deflect the variable guide vane 7 upwardly and downwardly based on operator input. The amount of deflection is preferably up to +25 degrees upwardly and up to −25 degrees downwardly. The forward duct 7 may be joined to the aft duct 4 via mounting flanges (not shown in FIGS. 1A and 1B), or welded, clamped, and/or bolted or as a composite structure. FIG. 4B illustrates, as an example, joining the forward 1 and aft duct 2 sections as a monocoque composite structure. However, other methods of joining not illustrated or referenced may be used as long as the method of joining the duct sections preferably does not significantly block or disrupt internal airflow and preferably provides adequate structure load.

Figure 1C:
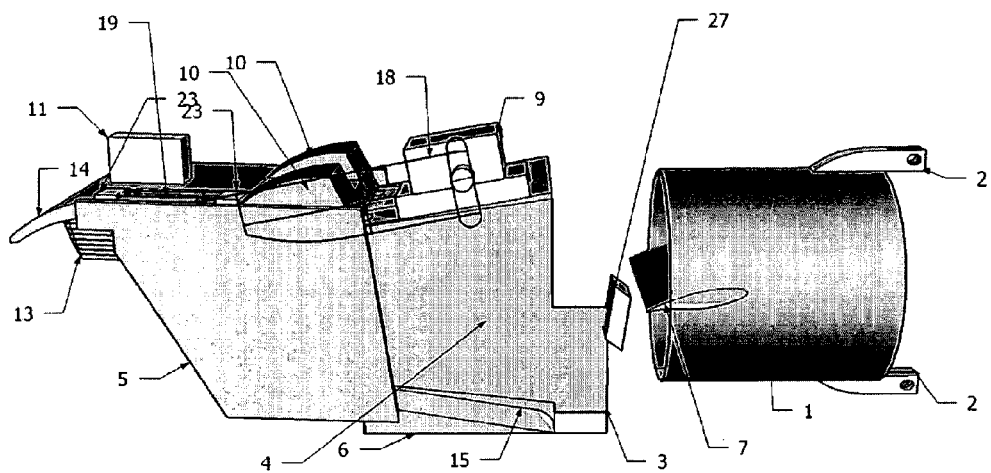

FIGS. 1A and 1C show two fixed guide vanes 5 attached to the left and right sides of the hinge mounted upper duct flap 14 to prevent air loss from the side when the joined aft variable duct flap structure 201 is deflected. The external geometry of the fixed guide vanes 5 may vary. FIGS. 1A and 1C show the fixed guide vane 5 as septagonal, but other geometries may be used. The fixed vanes 5 may be angled forward from the rear top vertex for the purpose of allowing a lower rudder vane 13 area to be exposed to the free air stream to allow for a high degree of responsiveness of yaw control in hover. The internal edges of the fixed guide vanes 5 that come into contact with the internal airflow may be rounded to streamline exiting air flow.

Figure 1D:
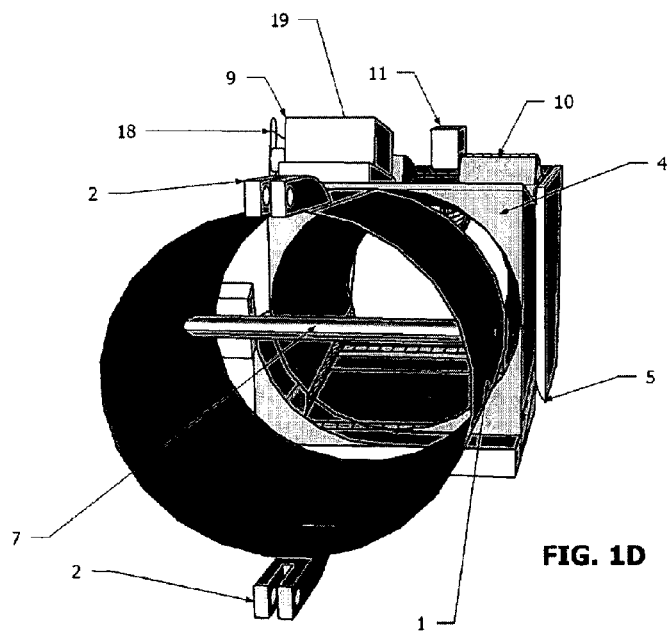
Figure 1E:
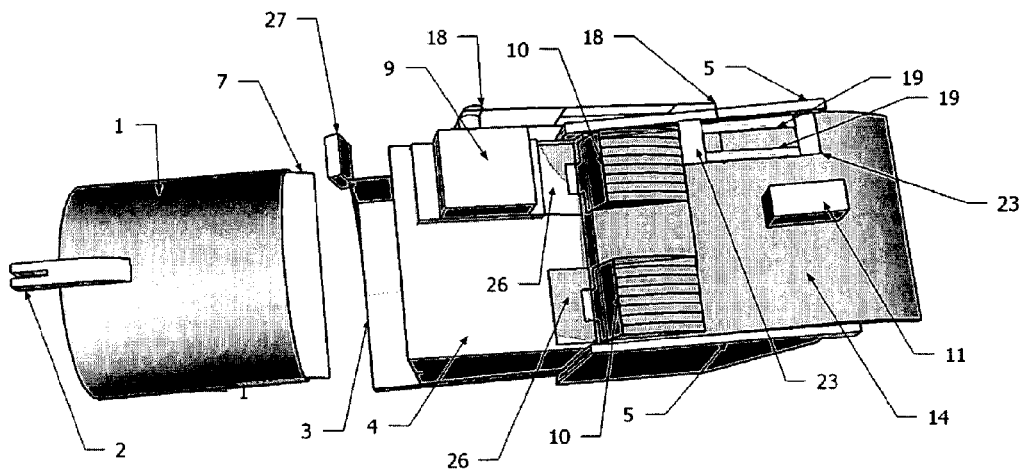
Figure 1F:
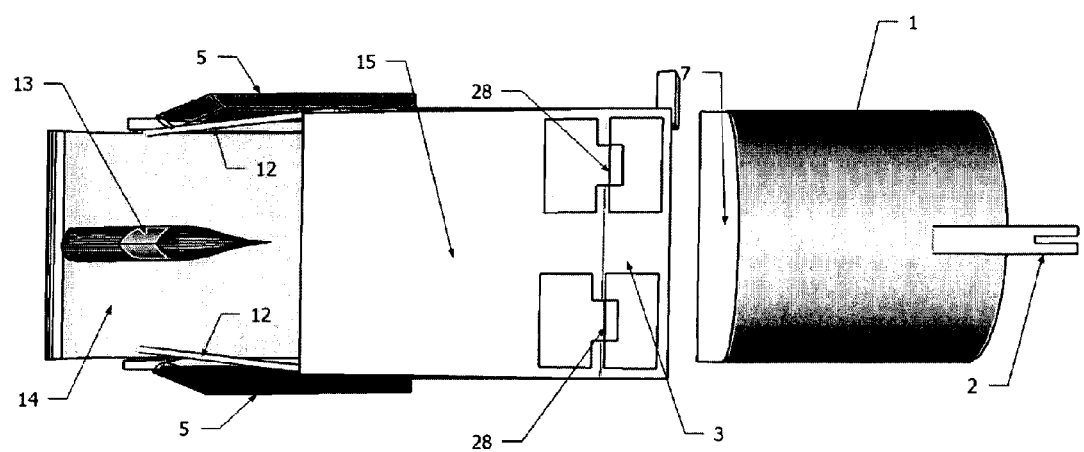
Figure 1G:
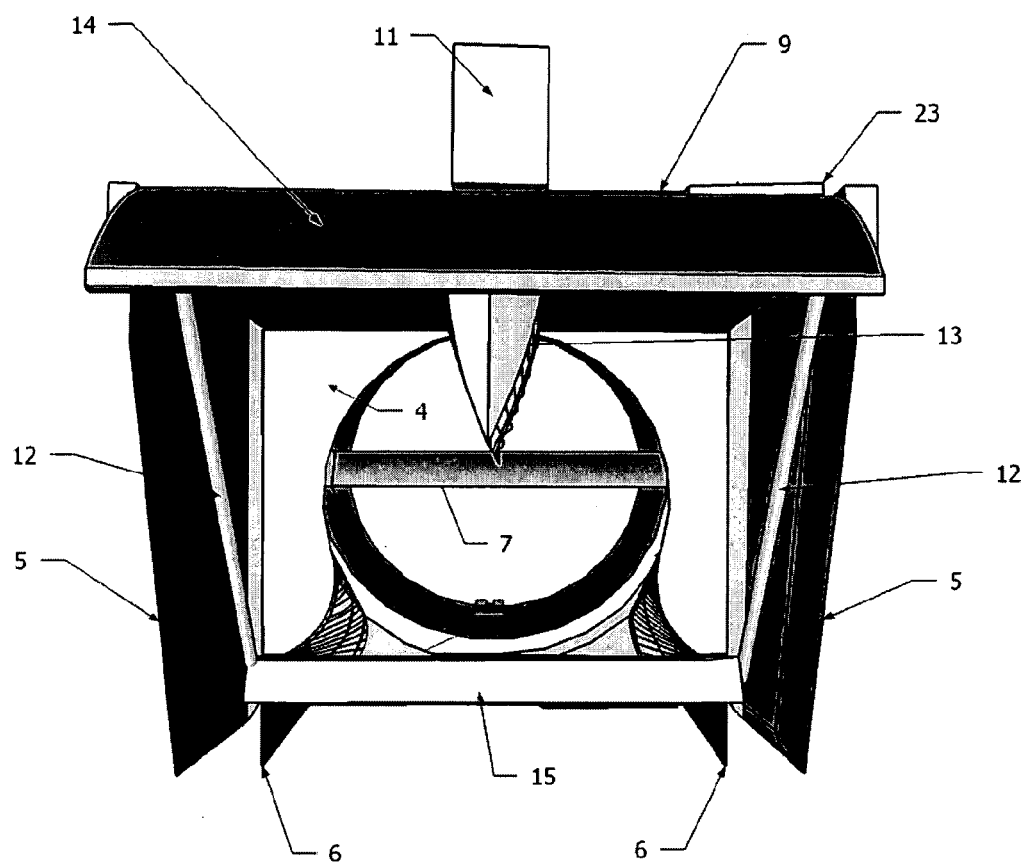

As illustrated in FIGS. 1A, 1B and 1G, the remaining components may include: two fixed flow guides 6 attached to the outer left and right lower flat sections of the rear duct 4 to prevent air loss/leaks during deflection of a lower hinge mounted variable flap 15; a variable rudder vane servo actuator 11 to operate the rudder vane 13, a servo-actuator 9 that may be mounted on the angled top flat external wall of the aft duct 4 and used to provide the necessary torque to deflect the upper variable duct flap 14 and lower variable duct flap 15 via linkages 18 (see FIG. 1E).

FIG. 1F shows a lower aft duct hinge mount 3, which is a mounting point for lower hinges 28 that support the lower variable duct flap 15. FIG. 1E shows a pair of top hinge mounts 10 that receive upper hinges 26 for the upper variable duct flap 14. The upper variable duct flap hinges 26 may also be fastened to the lower portion of the top angled aft duct housing 4 to complete hinge attachment. The hinges 26, 28 may be flat or pinned hinges attaching the aft duct 4 directly to the variable duct flaps 14, 15. However, in an alternative embodiment, the variable duct flaps 14, 15 may be connected or hinged to an airframe when installed in an aircraft. The variable duct flaps 14, 15 pivot about the lateral axis of the supporting hinges 26, 28 during upward and downward deflection.

As shown in FIGS. 1B and 1G, the variable duct flaps 14, 15 may be further joined at the rear on the right and left side outer edges by two linkages 12. The linkages 12 may be of a fixed length to maintain a fixed area of exit airflow within desired pressure/velocity range to minimize thrust loss; the attaching end point of the linkage 12 into the duct flaps is bent 90 degrees at a right angle perpendicular to the depicted linkage shown 12. The linkages 12 may be inserted or attached into the duct flaps 14, 15 so that during deflection the upper duct flap 14 and lower duct flap 15 pivot about the lateral axis of the linkage right angle bend ensuring fluid (i.e., non-binding) movement during deflection.

Figure 2A:
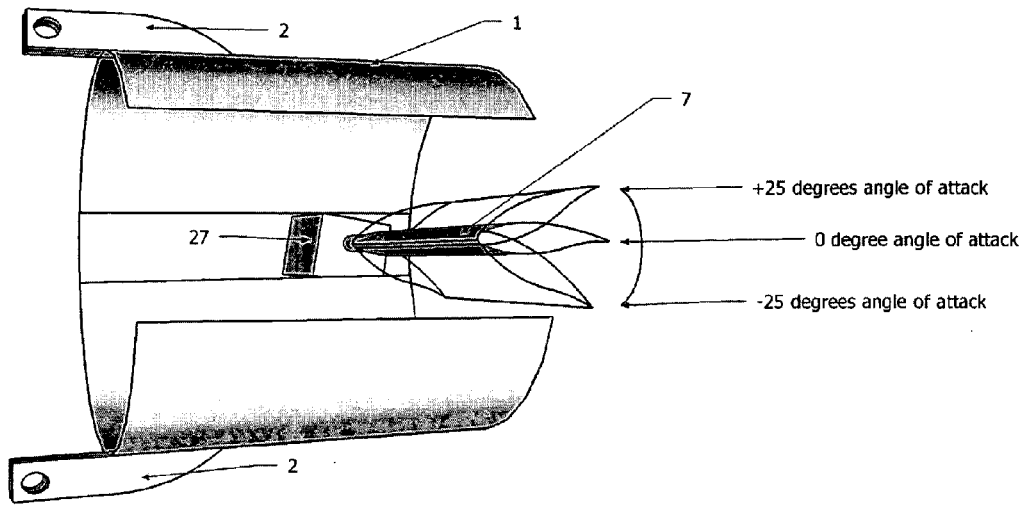
FIGS. 2A and 2B illustrate the range of deflection from a variable guide vane and depict servo-actuator operation of the variable guide vane housed in the forward annular duct from a left and aft (rear) looking forward cross-section view.
Figure 2B:
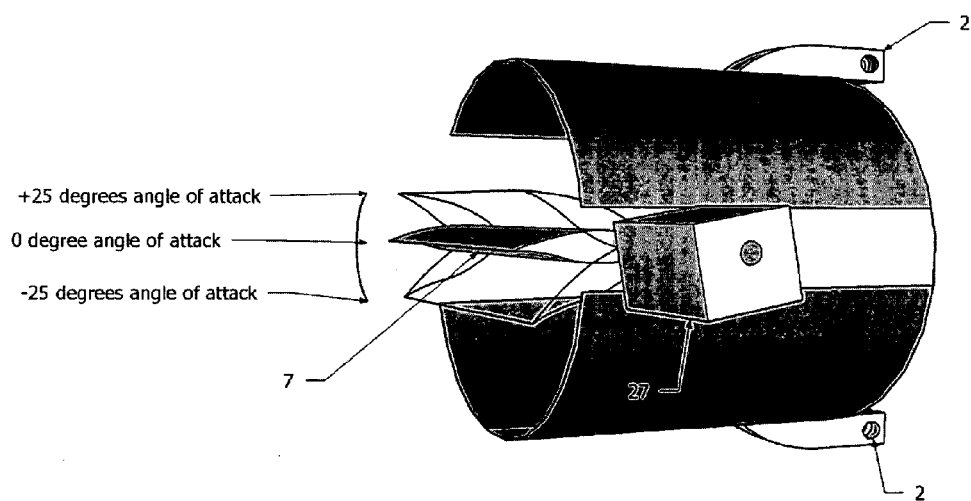

FIGS. 2A and 2B shows the variable guide vane 7 disposed within the forward duct 1. In FIG. 2B, the deflection range is shown as ranging from an upward or positive angle of attack (a.o.a) of up to a positive 25 degrees and to a downward or negative angle of attack of up to a minus 25 degrees. The variable guide vane 7 pivots about the lateral axis of a attaching shaft 71 which is housed and operated by a variable guide vane servo-actuator 27. A preferred embodiment of the attachment of the variable guide vane 7 to the attaching shaft is shown in FIG. 2A. FIG. 2A shows the attaching shaft 71 connected to the variable guide vane 7 through the side of the variable guide vane 7 at the leading edge of the vane, so that the variable guide vane 7 pivots at the leading edge.

The variable guide vane 7 may be used for streamlining airflow in the forward duct 1 to reduce turbulent flow, maintain area pressure/velocity relationship, augment lift and provide a means for two degrees of freedom: pitch up & down control without any increase or decrease in power setting. The variable guide vane cross-section may vary. FIGS. 2A and 2B depict the use of a Whitcomb Integral Super-Critical Foil, which is typically referred to as a National Advisory Council for Aeronautics (NACA) series foil. Other NACA series foils and modern foils may be used. The variable guide vane 7 preferably has a deflection capability up and down of 25 degrees to trim power (deflected up) and augment lift (deflected down) during v/stol mode. FIGS. 2A and 2B show the variable guide vane 7 attached to a servo-actuator 27 mounted on the port side of the duct outer wall. The servo-actuator 27 provides necessary and adequate torque for controlled deflection. Alternative embodiments may use different means for controlling the deflection of the variable guide vane 7. Embodiments of the present may have up to 30% or greater of the area of the vane 7 exposed to the free-stream. Other embodiments have 10% or less of the area of the vane 7 exposed to the free air stream. When deflected down, the airfoil properties of the guide vane 7 act as an aircraft high-lift device (flaps) augmenting lift.

Figure 3A:
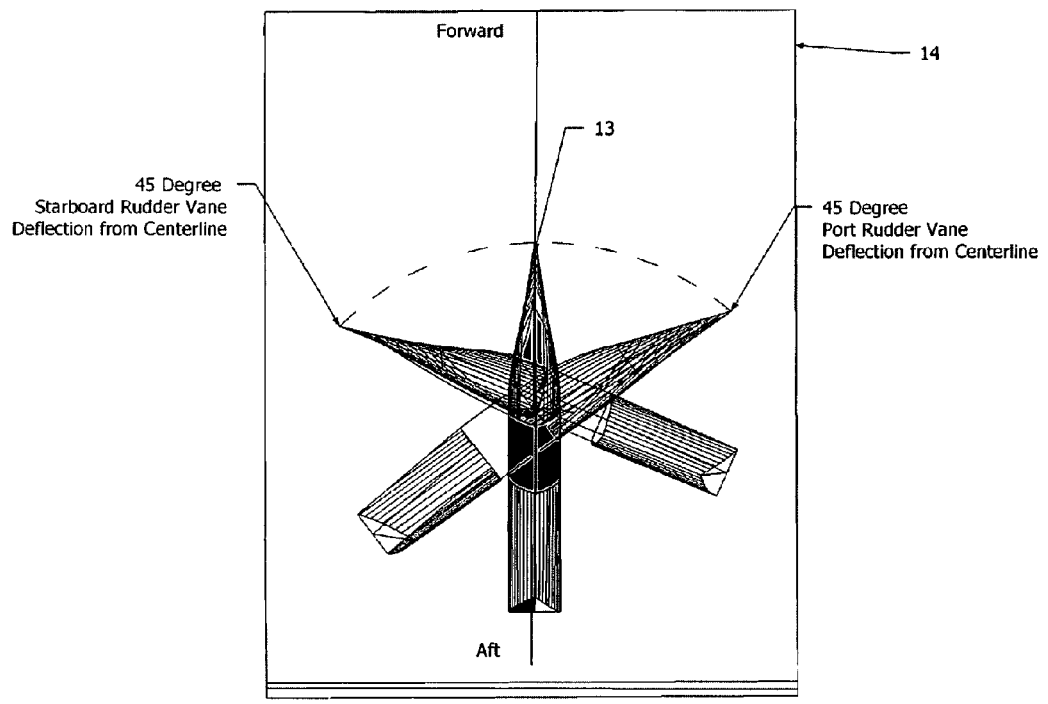
FIGS. 3A and 3B illustrate the range of deflection side to side (yaw) of a rudder vane, rudder vane mounting and a servo-actuator attachment to the rudder vane and the upper variable flap with hinge mounts depicted.
Figure 3B:
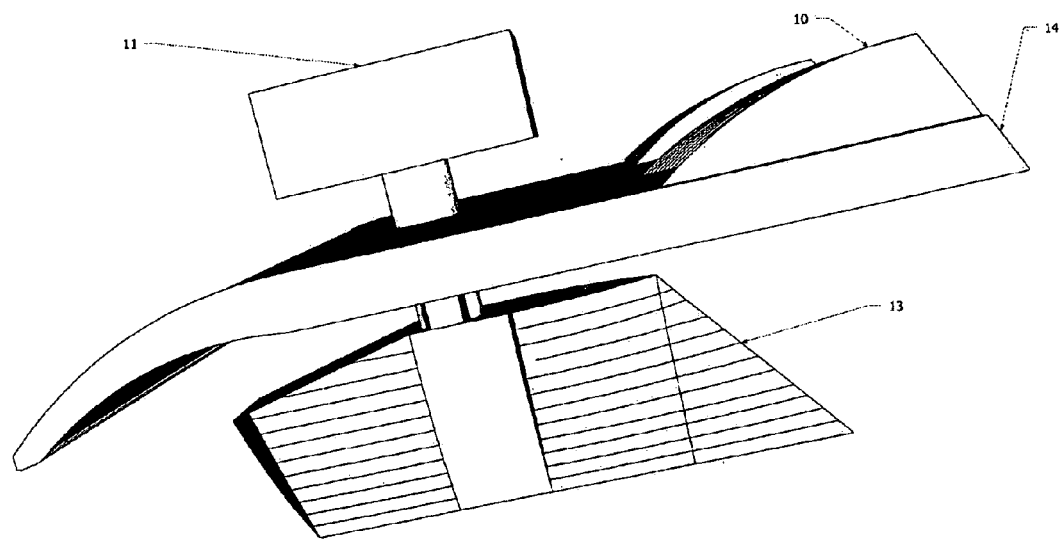

FIGS. 3A and 3B show the operation and placement of the rudder vane 13. As shown in FIG. 3B, the rudder vane 13 is affixed to the inside top area centerline of the upper ducted flap 14. FIG. 3A shows that the rudder vane 13 can preferably be deflected up to 45 degrees (port and starboard) to provide yaw control during v/stol hover operation. In a preferred embodiment, the rudder vane 13 is driven by a servo-actuator unit 11 mounted on top of the upper duct flap 14. The rudder vane 13 may also counteract torque from the spinning fan unit of the ducted fan powerplant. In an alternative embodiment, the rudder vane 13 may also be controlled by a gyroscopic device connected to the rudder vane actuator 11. The use of a gyroscope (head holding) enables better responsiveness from the rudder to adjust to cross-winds, and center of gravity shifts (balance) of the aircraft and may also improve yaw control.

Figure 4A:
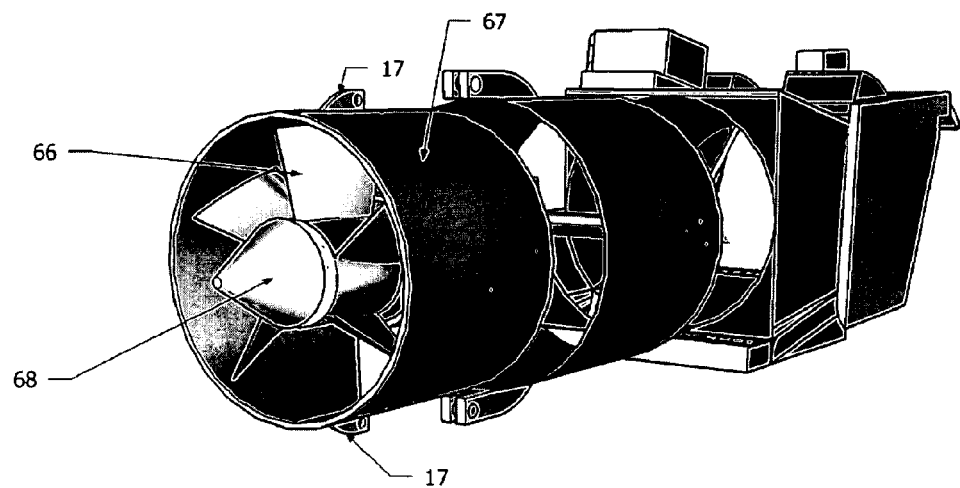
FIGS. 4A-4C illustrate an embodiment of the ducted propulsion vectoring system components when joined with a generic electric ducted fan (powerplant) in an exploded left side view; in a joined rear looking forward perspective view, and in a detailed left side cross-section view.
Figure 4B:
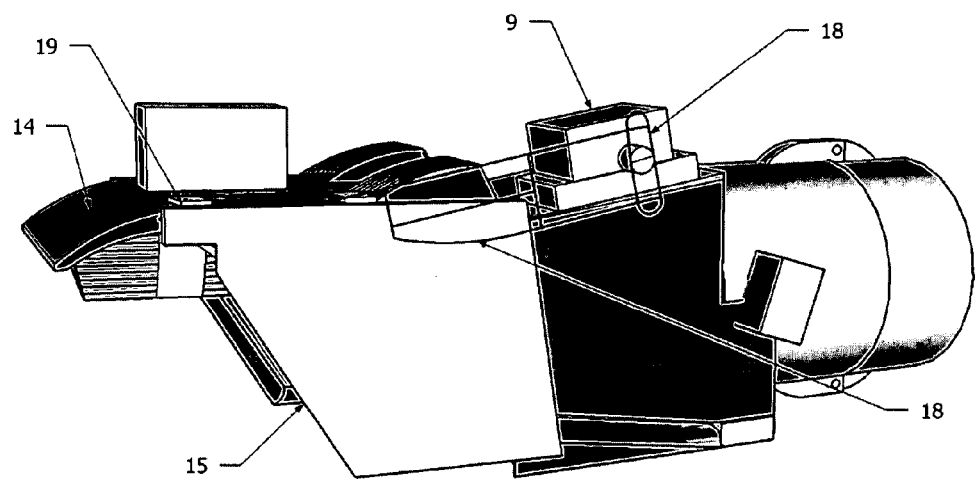
Figure 4C:
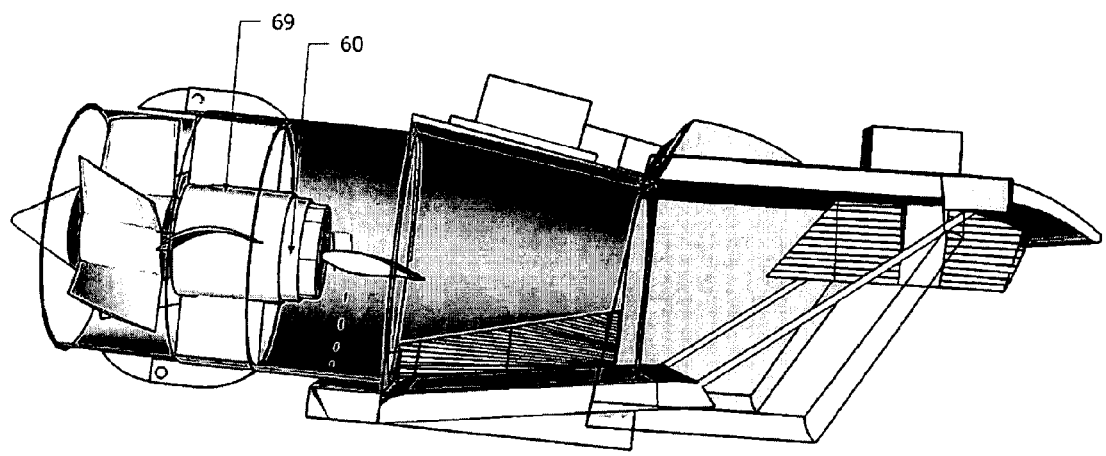

FIGS. 4A, 4B, and 4C show the joining of an embodiment of the ducted propulsion vectoring system to an electric ducted fan assembly 67, which includes at least one impeller/rotor 66, nose spinner 68 and fixed stator vanes 69 and electric motor 60. The electric motor 40 powers the fan via shaft torque; the spinning fan creates a mass flow of air through the ducted propulsion vectoring system. The electric ducted fan assembly 37 may be joined to the ducted propulsion vectoring system via two flanges 17 mounted on the outer wall of the electric ducted fan assembly 37.

As illustrated in FIG. 4B, the servo-actuator 9 used to operate the upper variable duct flap 14 and lower variable duct flap 15 transmits torque to the upper ducted variable flap 14 via the linkage 18 which is coupled to the servo-actuator 9. The aft end of the linkage 18 is contained within a slide track 19 mounted on the top outer surface of the upper variable ducted flap 14 (see also FIG. 1E). The end of the linkage 18 contained within the slide track 19 may bent at a right angle perpendicular to the linkage 18 and inserted into the track 19.

Figure 5A:
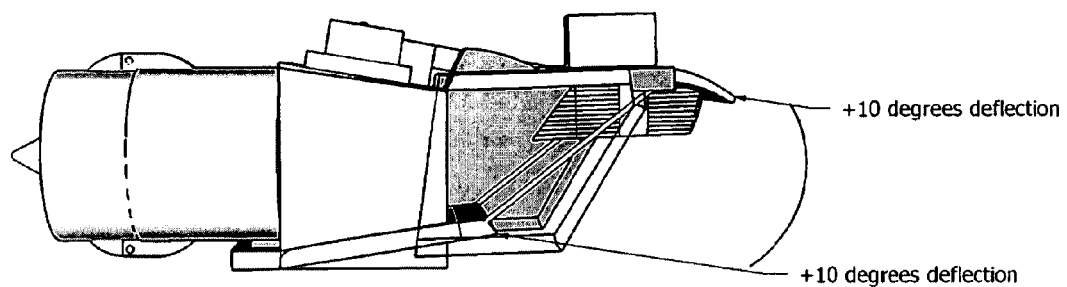
FIGS. 5A-5D illustrate degrees of deflection (thrust vectoring) from +10 degrees to −90 degrees of the hinge mounted upper and lower flaps from a left and right side cross-section view with generic electric ducted fan (powerplant).
Figure 5B:
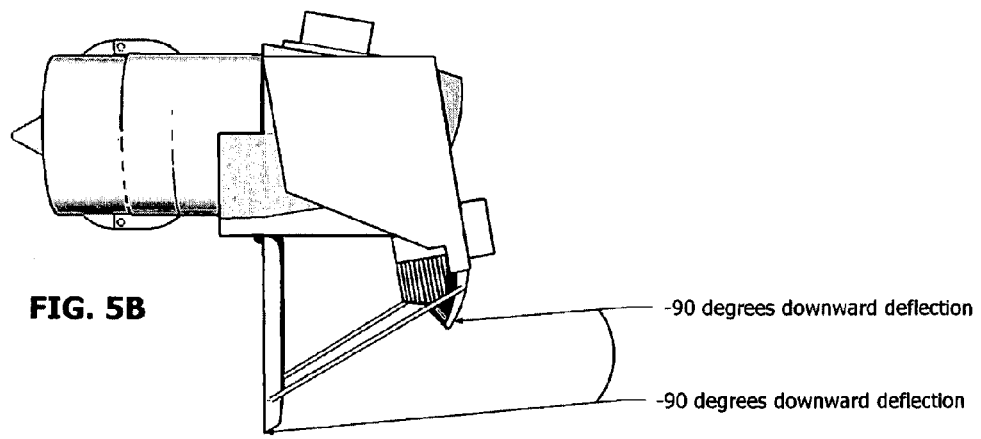
Figure 5C:
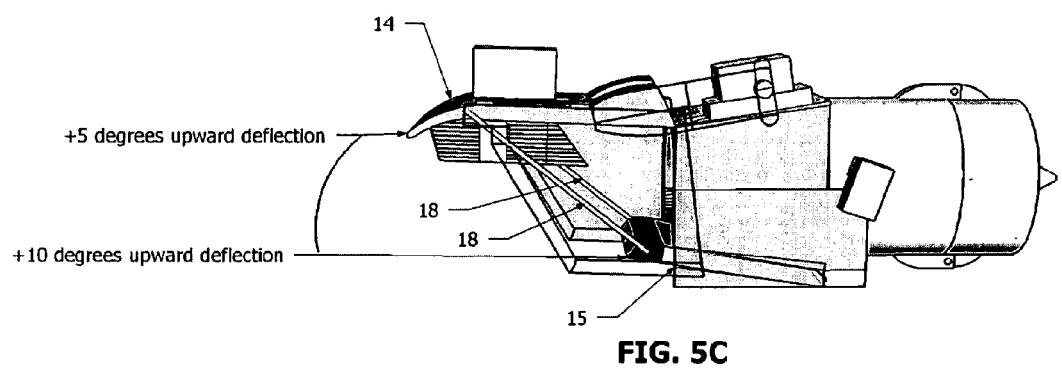
Figure 5D:
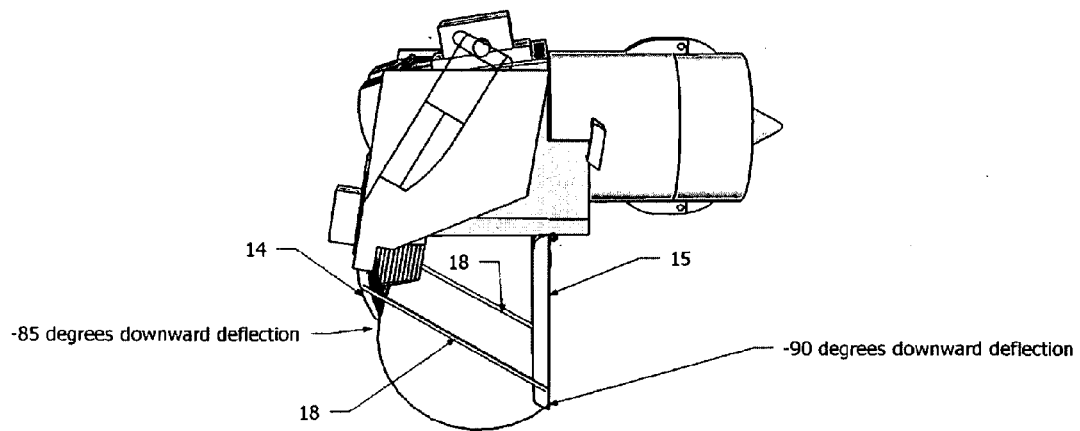

FIGS. 5A and 5C depict the operation of an embodiment of the present invention to provide generally horizontal thrust, while FIGS. 5B and 5D show the operation to provide vertical thrust. FIGS. 5A and 5B show the deflection range of the upper variable duct flap 14 and lower variable duct flap 15. Deflected upward, the upper variable flap 14 may range beyond the zero degree angle and up to plus 10 degrees or greater to vector airflow upwards to change pitch. Deflected downward, the upper variable flap 14 may down to an angle around minus 90 degrees to change pitch. The lower variable flap 15 may be deflected upwards beyond zero degrees and up to plus 10 degrees or greater to maintain the area pressure/velocity relationship, minimize thrust loss, and change pitch. Deflected downward, the lower variable flap 15 may be turned down to an angle around minus 90 degrees to change pitch. During downward deflection when the lower variable flap 15 has turned through minus 90 degrees, the thrust is vectored downward and enables lift. FIGS. 5C and 5D show the articulating linkage 18 transferring torque to operate the deflection of the upper and lower flaps 14, 15 in an upward and downward fashion.

Figure 6A:
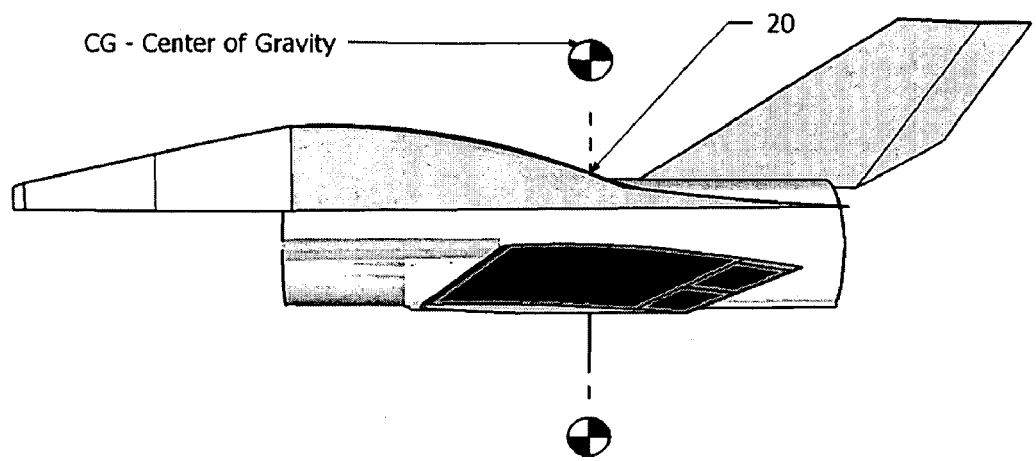
FIGS. 6A-6C illustrates another embodiment of the ducted propulsion vectoring system installed in an aircraft with intake sufficient in area and geometry (eyelet shaped) to provide adequate airflow to the powerplant with the aircraft's center of gravity at or near the center area of exiting thrust flow when flaps are deflected downward −90 degrees; two articulating airframe doors that open to allow flap deflection and when retracted adhere to the contour of the aircraft airframe bottom fuselage.
Figure 6B:
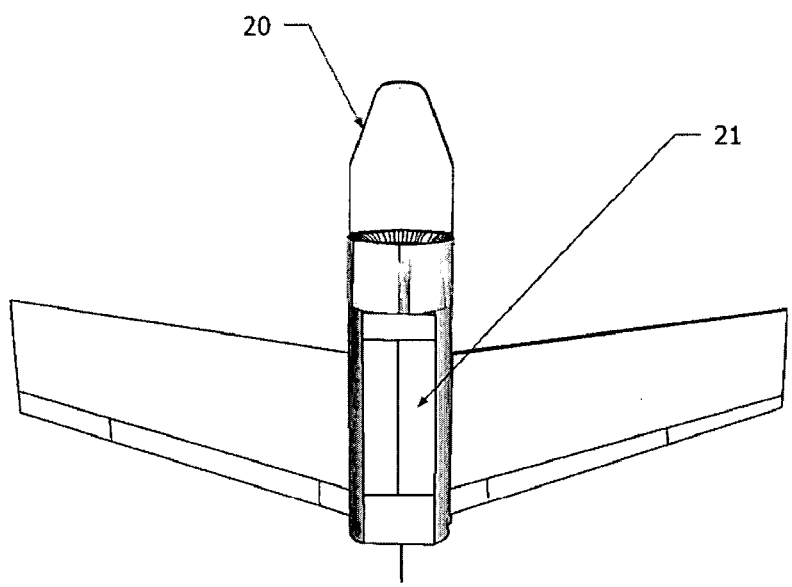
Figure 6C:
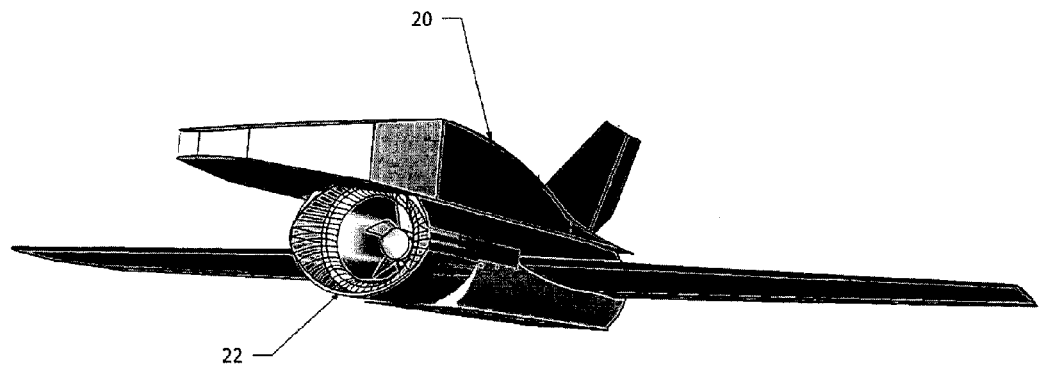
Figure 7:
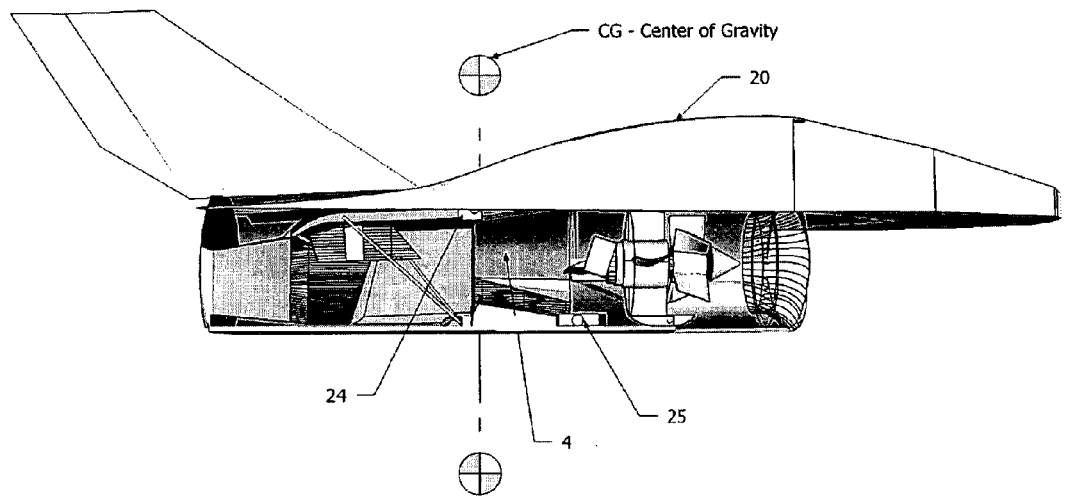
FIG. 7 depicts a ducted propulsion vectoring system disposed within an aircraft airframe joined to generic electric ducted fan powerplant, in a right side, detailed cross-section view.

FIGS. 6A-6C, 7, 8A-8B depict an embodiment of the ducted propulsion vectoring system installed in an aircraft. The aircraft 20 is powered by a single powerplant and consists of at least 1 wing, vertical stabilizer and aileron. The aircraft center of gravity is shown in FIGS. 6A and 7 and is preferred to be located at the area center of the upper and lower variable duct flaps 14, 15 when deflected downward to maintain aircraft stability during initial lift and hover operation. FIG. 6C shows the aircraft inlet-intake 22 of the single powerplant.

Figure 8A:
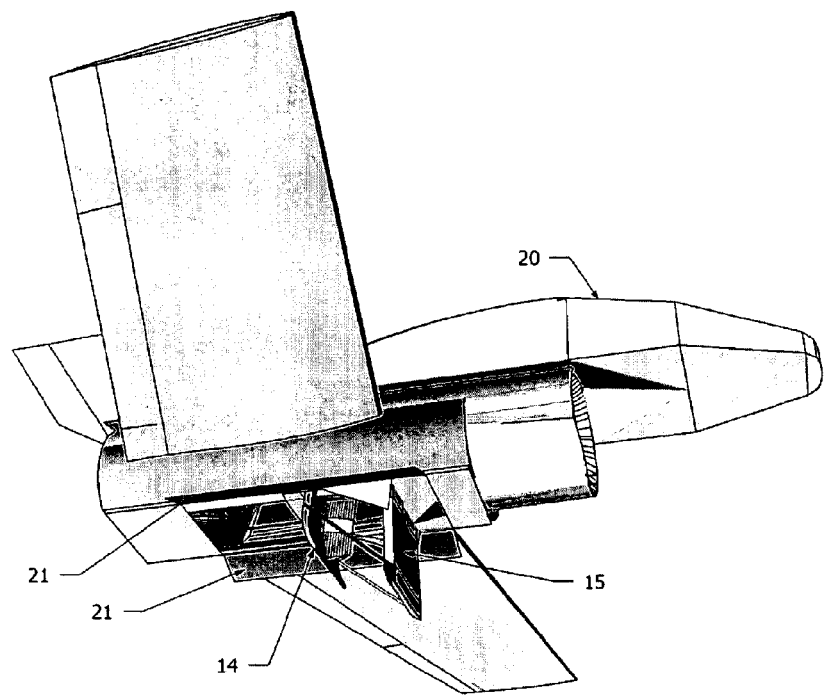
FIGS. 8A and 8B depict a ducted propulsion vectoring system in aircraft with articulating fuselage doors.
Figure 8B:
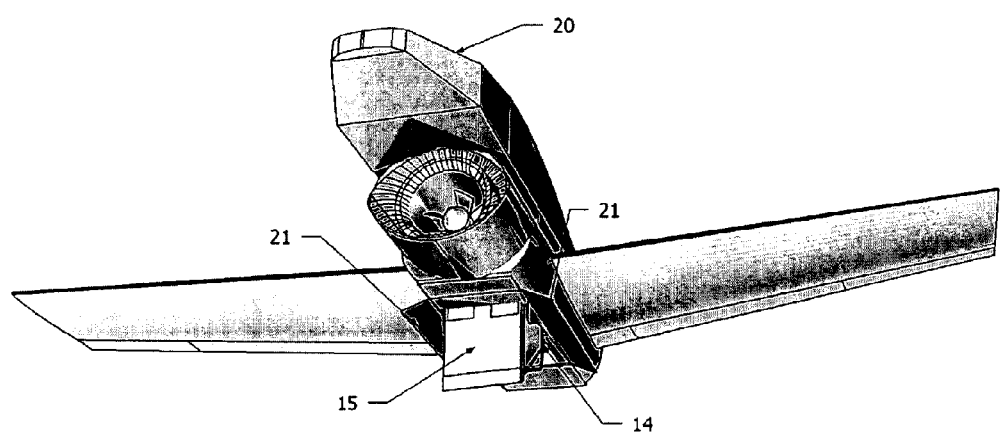

As illustrated in FIG. 6B, the aircraft under belly fuselage has two articulating doors 21 that, when opened, allow for the upper and lower variable duct flaps 14, 15 to deflect downward without restriction/binding or surface contact/friction with the airframe. FIGS. 8A and 8B show the articulating doors 21 in the open position to allow the downward deflection of the upper and lower variable duct flaps 14, 15. FIG. 8A depicts a right side view of an embodiment of the ducted propulsion vector system on a aircraft 20 with the lower and upper variable flaps 14, 15 fully deflected downward with the aircraft articulating airframe doors 21 in the open position. FIG. 8B is a forward view of the same configuration FIG. 7 is a right side, cross section, detailed view of the aircraft 20 with an embodiment of the ducted propulsion vector system coupled to a ducted fan system. As shown in FIG. 7, the servo-actuator/actuators 24, 25 used to control the deflection of the upper and lower variable duct flaps 14, 15 need not be installed on the aft duct 4 as shown in FIGS. 1C-1E, but may be attached to the airframe as two separate actuating units 24, 25. With the servo-actuators 24, 25 attached to the airframe the variable duct flap push-rod linkage 18 and track 19 may not be needed shown in FIGS. 1C-1E. The servo-actuator 24, 25 may be mounted to airframe and splined directly to pin hinge assy. Therefore, the push rod linkage 18 may not be needed as each flap may be controlled independently by the upper and lower servo-actuator 24, 25.

Figure 9:
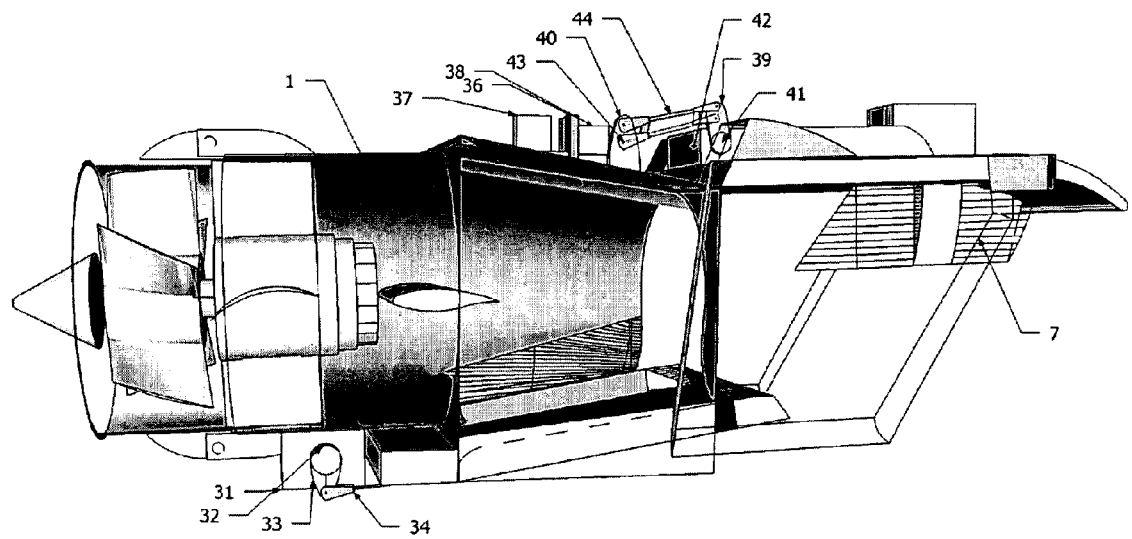
FIG. 9 depicts an alternative method of actuation for independent control of upper and lower duct flaps.
Figure 9A:
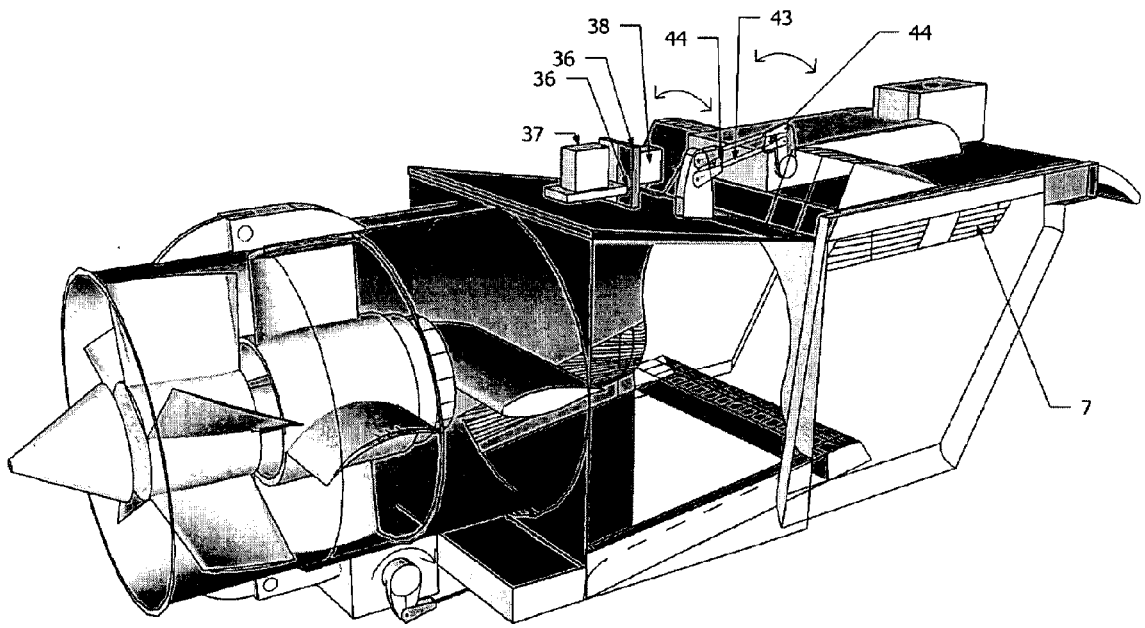
FIG. 9A is detailed view of alternative upper actuation method with gyros installed.
Figure 9B:
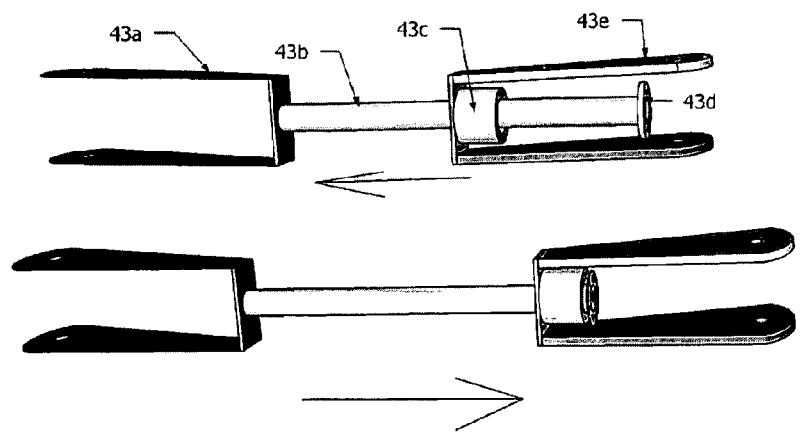
FIG. 9B is detailed view of floating clevis and rod assembly for alternative upper duct flap actuation.
Figure 9C:
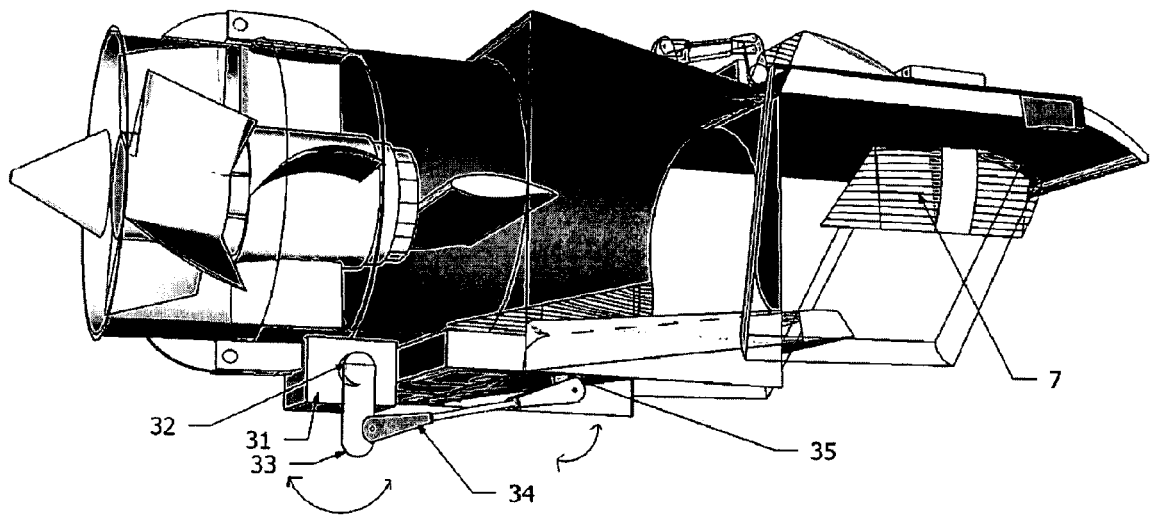
FIG. 9C is detailed view of lower duct flap alternative actuation.

FIGS. 9, 9A, and 9C depict an alternative method for actuation of the upper and lower duct flap 14, 15 by an independent servo-actuator 42 control of the upper duct flap 14 and independent servo-actuator 31 control of the lower duct flap 15, as opposed to connection of lower duct flap door 15 to upper duct flap door 14 with fixed linkage. Each servo-actuator 31, 42 may be controlled by a gyroscopic device. A yaw moment gyro 37 may be installed on a gyro mount assembly 36 at or near the center of gravity and may adjust rudder vane 7 independently of operator input to maintain fixed yaw position based on operator selection. A pitch moment gyro 38 may be installed on a gyro mount assembly 36 at or near the center of gravity and may be used to adjust upper and lower duct flaps 14, 15 independently or combined, independent of operator input to maintain level vehicle altitude and angle of attack. A horn attachment 39 to an upper servo-actuator actuator shaft 41 which connects to a fixed clevis and rod assembly 44 and floating clevis and rod assembly 43 enable support and freedom of movement of the upper servo actuator 42 as torque is transferred through the horn 39, fixed and floating clevis and rod assembly 44, 43 for deflection of the upper duct flap 14. The upper servo-actuator 42 is mounted directly on the top surface of the upper duct flap 14. FIG. 9A is a detailed view of the alternative method of actuation for the upper duct flap 14, pitch and yaw moment gyro 37, 38 configuration, as described above.

As shown in FIG. 9, the lower duct flap servo-actuator 31 is mounted on the bottom center of the forward duct 1. Torque to deflect the lower duct flap 15 is transferred through the servo-actuator shaft 32 which is attached to a horn 33 which is pivotally attached to a lower duct flap fixed clevis and rod assembly 34.

FIG. 9B provides an exploded view of the upper duct flap floating clevis and rod assembly 43. Unlike the upper fixed clevis and rod assembly 44 and lower duct flap fixed clevis and rod assembly 34, the clevis 43e pivotally attached to the upper horn 39 is not fixed by means of weld, solder, glue or otherwise joined by any means that would prevent the travel of the connecting rod 43b. Rather, the connecting rod 43b is fixed at the clevis end 43a that is pivotally attached to the upper clevis and rod assembly mount 40. The clevis 43e slides along the rod axially as the upper servo-actuator 42 transfers torque, to allow for non-binding movement. The rod 43b is prevented from detaching from the clevis 43e through a stop washer 43d that may be fixed to the connecting rod 43b. A bushing 43c guides the rod as it travels limiting binding from friction. As indicated in the upper drawing of FIG. 9B, the arrow illustrates direction of travel of the clevis when the upper duct flap 14 is in the retracted position at 0 degree to +10 degree angle of attack. The clevis 43e travels aft to forward position as the arrow indicates in the lower drawing of FIG. 9B. The clevis travels forward to aft when the upper duct flap is deflected downward −90 degrees.

FIG. 9C is a detailed view of the lower servo-actuator 31 and the fixed clevis and rod assembly 34 in this alternative embodiment. A horn assembly 35 is mounted to the bottom surface of the lower duct flap 15. The fixed clevis and rod assembly 34 is pivotally attached to the horn assembly 35 and to the horn attachment 33, which is attached to the lower servo-actuator shaft 32. The arrows in FIG. 9C indicate direction of travel of the clevis and rod assembly 34 as torque is transferred to open and close the lower duct flap 15.

Figure 10A:
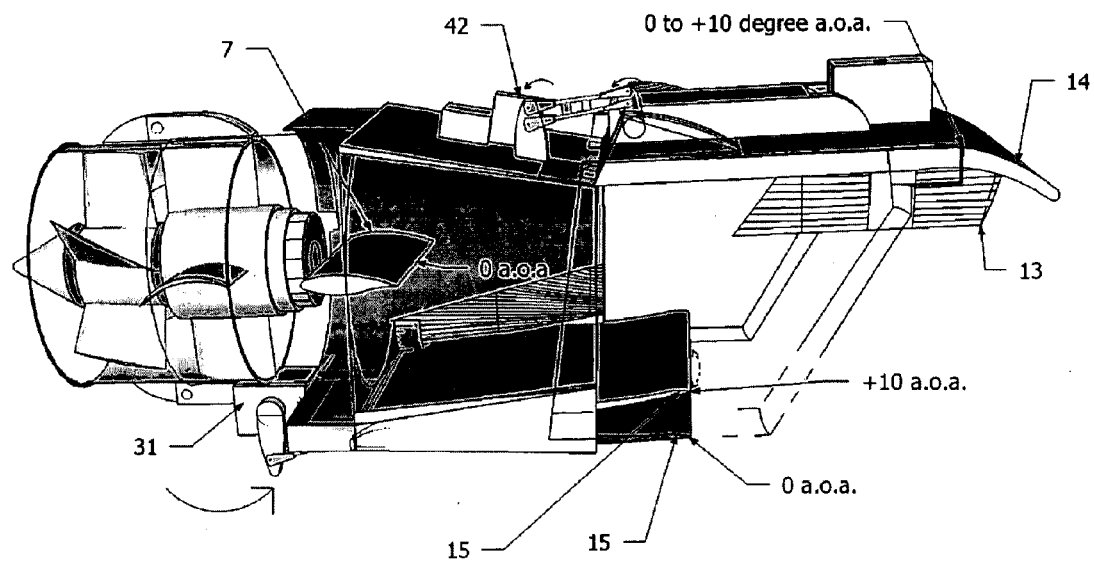
FIGS. 10A and 10B details hover to forward and forward flight to hover transition of the ducted propulsion vectoring system.
Figure 10B:
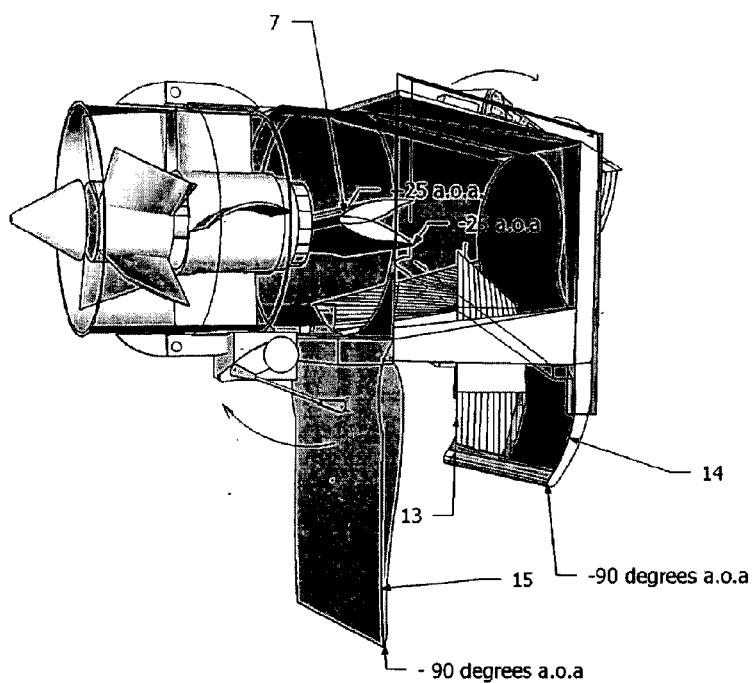

FIGS. 10A and 10B are detailed views of the variable guide vanes 7, 13 positioning in hover and flight transition, and the angle of attack of the upper and lower duct flaps 14, 15 in hover and flight transition.

FIG. 10A shows the various positions during forward flight and range of angle of attack affecting airspeed and pitch moment. The variable guide vane 7 is typically at zero angle of attack during forward flight. At zero angle the airflow is streamlined with the variable guide vane 7 in this position. The lower duct flap 15 may be vectored during forward flight to increase airspeed. FIG. 10A depicts the zero angle of attack of the lower duct flap 15 which provides constant air speed. FIG. 10A also shows the deflection the lower duct flap 15 to +10 degrees angle of attack. When the lower duct flap 15 is vectored up +10 degrees and the upper duct flap 14 is at zero angle of attack as shown in FIG. 10A, airspeed will increase. When the upper duct flap 14 and lower duct flap 15 are both vectored or deflected upward +10 degrees, a pitching moment (up) will occur. Level flight is resumed by returning the upper and lower duct flaps 14, 15 to zero angle position. The rudder vane 13 remains fixed on the centerline on the bottom of the upper duct flap 14 maintaining yaw moment and fixed directional control. Deflecting the rudder vane 13, as, for example, shown in FIG. 3A, will cause yaw action port and starboard based on operator or gyroscopic device input.

To facilitate transition from forward flight to hover position, the variable guide vane 7 may be deflected upward disrupting airflow and reducing constant air speed, slowing the vehicle. The preferred upward deflection is +25 degrees. Then the upper duct flap 14 and the lower duct flap 15 may be vectored downward up to −90 degrees via the servo-actuators 31, 42, vectoring thrust downwardly terminating forward flight. As the upper and lower duct flaps 14, 15 are vectored downward, the variable guide vane 7 may also be deflected downward passing through zero angle of attack to provide augmented lift which may stabilize the vehicle and may serve to prevent rapid descent. Preferably, the variable guide vane 7 is deflected downwards to a −25 degree angle of attack. The rudder vane 13 remains fixed on the centerline on the bottom of the upper duct flap 14 maintaining yaw moment and fixed directional control. Deflecting the rudder vane 13, as, for example, shown in FIG. 3A, will cause yaw action port and starboard based on operator or gyroscopic device input during the flight to hover transition.

To facilitate transition from hover to forward flight transition, the inverse of the actions noted in the preceding paragraphs may be performed to achieve level forward flight. The variable guide vane 7 may be deflected downward (preferably to −25 degrees) to provide augmented lift and stabilizing pitch moment. The upper and lower duct flaps 14, 15 may be engaged at −90 degrees in hover. To transition to forward flight, the upper and lower duct flaps 14, 15 are vectored upwardly to zero angle as shown in FIG. 10A and the variable guide vane 7 may then be deflected to zero degree angle as shown in FIG. 10A to streamline airflow. The rudder vane 13 remains fixed on the centerline on the bottom of the upper duct flap 14 maintaining yaw moment and fixed directional control. Deflecting the rudder vane 13 will cause yaw action port and starboard based on operator or gyroscopic device input during the hover to flight transition.

The foregoing Detailed Description of exemplary and preferred embodiments is presented for purposes of illustration and disclosure in accordance with the requirements of the law. It is not intended to be exhaustive nor to limit the invention to the precise form or forms described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising step(s) for . . . "

The invention claimed is:

1. A ducted propulsion vectoring system for an aircraft comprising:
   a forward duct structure having an annular shaped interior and at a forward end adapted to receive a fluid stream from a thrust generating engine;
   an aft duct structure extending from an input end disposed to receive a fluid stream from the forward duct structure, wherein an upper portion of an interior of the aft duct structure has an upper conical lengthwise shape narrowing from the input end to a rear end and a lower portion of the interior of the aft duct structure has an opening extending from a position at or near the input end of the aft duct structure to a position at or near the rear end of the aft duct structure;
   an upper variable duct flap pivotally attached adjacent the rear end of the aft duct structure at an upper position relative to the path of the fluid stream to define an upper controlling surface for the fluid stream;
   a lower variable duct flap pivotally attached adjacent the front end of the aft duct structure and adjacent the aft duct structure opening at a lower position relative to the path of the fluid stream to define a lower controlling surface for the fluid stream;
   a movement control assembly controlling pivoting of the upper variable duct flap and pivoting of the lower variable duct flap; and
   a first variable guide vane having a horizontal pivot axis and mounted in the fluid stream forward of the upper and lower variable duct flaps thereby to provide deflection of the fluid stream upward and/or downward;
   whereby an aircraft equipped with the ducted propulsion vectoring system is enabled control flight of the aircraft to include vertical lift, hover and forward flight by control of the upper and lower variable duct flaps and of the first variable guide vane.

2. The ducted propulsion vectoring system according to claim 1 further comprising:
   a second variable guide vane mounted on the upper variable duct flap and having a pivot axis normal to the fluid stream path across the surface of the upper variable duct flap thereby to provide yaw control by deflecting the fluid path left and/or right.

3. The ducted propulsion vectoring system according to claim 1, wherein the movement control assembly comprises:
   an actuation mechanism attached at one end to the upper variable duct flap, and
   one or more elongate linkages pivotally attached at a first end to the upper variable duct flap and pivotally attached at a second end to the lower variable duct flap.

4. The ducted propulsion vectoring system according to claim 1, wherein the movement control assembly comprises:
   a first actuation mechanism controlling pivoting of the upper variable duct flap, and
   a second actuation mechanism controlling pivoting of the lower variable duct flap.

5. The ducted propulsion vectoring system according to claim 1, wherein the forward duct structure and the aft duct structure are joined as a monocoque composite structure.

6. The ducted propulsion vectoring system according to claim 1, further comprising:
   a left fixed guide vane attached to a left side of the upper variable duct flap and projecting generally perpendicular to a plane defined by the upper variable duct flap and parallel to the path of the fluid stream, and
   a right fixed guide vane attached to a right side of the upper variable duct flap and projecting generally perpendicular to a plane defined by the upper variable duct flap and parallel to the path of the fluid stream.

7. The ducted propulsion vectoring system according to claim 1, further comprising one or more gyroscopic devices providing control information to the movement control assembly.

8. A method for ducted propulsion providing for horizontal thrust and vertical thrust for an air vehicle, the method comprising:
   directing a fluid stream through a forward duct structure, wherein the forward duct structure has a first variable guide vane horizontally disposed within its interior;
   receiving the fluid stream within an aft duct structure, wherein the aft duct structure has exit diameter equal to or less than an entry diameter of the forward duct structure; and
   directing the fluid stream from the aft duct structure towards a variable flap structure comprising an upper variable duct flap pivotally attached adjacent a rear end of the aft duct structure at an upper position relative to the path of the fluid stream and a lower variable duct flap pivotally attached adjacent a front end of the aft duct structure and adjacent an aft duct structure opening at a lower position relative to the path of the fluid stream;
   and wherein providing horizontal thrust comprises:
   deflecting the upper variable duct flap and the lower variable duct flap in a direction generally parallel to a direction of the fluid stream through the forward duct structure; and
   deflecting the first variable guide vane in a direction generally parallel to the direction of the fluid stream through the forward duct structure,
   and wherein providing vertical thrust comprises:
   deflecting the upper variable duct flap and the lower variable duct flap in a direction generally perpendicular to the direction of the fluid stream through the forward duct structure, and
   deflecting the first variable guide vane to provide lift control.

9. The method according to claim 8 wherein a second variable guide vane is mounted on the upper variable duct flap and has a pivot axis normal to the fluid stream path across the surface of the upper variable duct flap, and the method further comprises deflecting the second variable guide vane left and/or right to provide yaw control.

10. The method according to claim 9, further comprising transitioning from vertical thrust to horizontal thrust, wherein the transition comprises:
  deflecting the first variable guide vane in an downward direction relative to the direction of the fluid flow through the forward duct structure to provide augmented lift and stabilizing pitch moment;
  pivoting the upper variable duct flap and the lower variable duct flap towards the direction generally parallel to the direction of the fluid stream through the forward duct structure; and
  deflecting the first variable guide vane to a direction generally parallel to the to the direction of the fluid flow through the forward duct structure.

11. The method according to claim 8, wherein providing horizontal thrust comprises:
  deflecting the upper variable duct flap at an angle from 0 degrees to +10 degrees above a horizontal plane defined by the direction of the fluid flow through the forward duct structure, and
  deflecting the lower variable duct flap at an angle from 0 degrees to +15 degrees above a horizontal plane defined by the direction of the fluid flow through the forward duct structure.

12. The method according to claim 8, wherein providing vertical thrust comprises:
  deflecting the upper variable duct flap at an angle from −80 degrees to −90 degrees below a horizontal plane defined by the direction of the fluid flow through the forward duct structure, and
  deflecting the lower variable duct flap at an angle from −80 degrees to −90 degrees below a horizontal plane defined by the direction of the fluid flow through the forward duct structure.

13. The method according to claim 8, further comprising transitioning from horizontal thrust to vertical thrust, wherein the transition comprises:
  deflecting the first variable guide vane in an upward direction relative to the direction of the fluid flow through the forward duct structure;
  pivoting the upper variable duct flap and the lower variable duct flap towards the direction generally perpendicular to the direction of the fluid stream through the forward duct structure; and
  deflecting the first variable guide vane downward to provide augmented lift.

14. An air vehicle capable of vertical and/or short take-off and landing, the air vehicle comprising:
  a fuselage;
  one or more wings; and
  at least one power plant, the at least one power plant comprising:
    a ducted fan thrust generating engine for generating a fluid stream;
    a forward duct structure having an annular shaped interior and at a forward end adapted to receive the fluid stream and having a rear end;
    an aft duct structure extending from an input end disposed to receive a fluid stream from the forward duct structure, wherein an upper portion of an interior of the aft duct structure has an upper conical lengthwise shape narrowing from the input end to a rear end and a lower portion of the interior of the aft duct structure has an opening extending from a position at or near the input end of the aft duct structure to a position at or near the rear end of the aft duct structure;
    an upper variable duct flap pivotably attached adjacent the rear end of the aft duct structure at an upper position relative to the path of the fluid stream to define an upper controlling surface for the fluid stream;
    a lower variable duct flap pivotably attached adjacent the front end of the aft duct structure and adjacent the aft duct structure opening at a lower position relative to the path of the fluid stream to define a lower controlling surface for the fluid stream;
    a movement control assembly controlling pivoting of the upper variable duct flap and pivoting of the lower variable duct flap; and
    a first variable guide vane having a horizontal pivot axis and mounted in the fluid stream forward of the upper and lower variable duct flaps thereby to provide deflection of the fluid stream upward and/or downward;
  whereby the air vehicle is enabled to control flight to include vertical lift, hover and forward flight by control of the upper and lower variable duct flaps and of the first variable guide vane.

15. The air vehicle according to claim 14 further comprising:
  a second variable guide vane mounted on the upper variable duct flap and having a pivot axis normal to the fluid stream path across the surface of the upper variable duct flap thereby to provide yaw control by deflecting the fluid path left and/or right.

16. The air vehicle according to claim 14, wherein the movement control assembly comprises:
  an actuation mechanism attached at one end to the upper variable duct flap, and
  one or more elongate linkages pivotally attached at a first end to the upper variable duct flap and pivotally attached at a second end to the lower variable duct flap.

17. The air vehicle according to claim 14, wherein the movement control assembly comprises:
  a first actuation mechanism controlling pivoting of the upper variable duct flap, and
  a second actuation mechanism controlling pivoting of the lower variable duct flap.

18. The air vehicle according to claim 17, wherein the first actuation mechanism and the second actuation mechanism are mounted on the fuselage.

19. The air vehicle according to claim 14, wherein the fuselage comprises one or more articulating doors disposed beneath the upper variable duct flap and the lower variable duct flap.

20. The air vehicle according to claim 14, further comprising:
  a left fixed guide vane attached to a left side of the upper variable duct flap and projecting generally perpendicular to a plane defined by the upper variable duct flap and parallel to the path of the fluid stream, and
  a right fixed guide vane attached to a right side of the upper variable duct flap and projecting generally perpendicular to a plane defined by the upper variable duct flap and parallel to the path of the fluid stream.

* * * * *